(12) United States Patent
Nachtigal et al.

(10) Patent No.: US 10,054,479 B2
(45) Date of Patent: Aug. 21, 2018

(54) BED WITH AUTOMATIC WEIGHT OFFSET DETECTION AND MODIFICATION

(71) Applicant: Hill-Rom Services, Inc., Batesville, IN (US)

(72) Inventors: Daniel Nachtigal, Brookline, MA (US); Florin Iucha, Winter Park, FL (US)

(73) Assignee: Hill-Rom Services, Inc., Batesville, IN (US)

( * ) Notice: Subject to any disclaimer, the term of this patent is extended or adjusted under 35 U.S.C. 154(b) by 184 days.

(21) Appl. No.: 15/138,340

(22) Filed: Apr. 26, 2016

(65) Prior Publication Data

US 2016/0327426 A1    Nov. 10, 2016

Related U.S. Application Data

(60) Provisional application No. 62/157,005, filed on May 5, 2015.

(51) Int. Cl.
*A61G 7/05* (2006.01)
*G01G 19/44* (2006.01)
(Continued)

(52) U.S. Cl.
CPC ............ *G01G 19/445* (2013.01); *A61G 7/05* (2013.01); *A61G 7/0527* (2016.11);
(Continued)

(58) Field of Classification Search
CPC .. A61M 2209/08; A61B 5/115; A61B 5/6892; A61B 5/7278; A61B 5/7475; A61B 2562/0252; A61B 5/742; A61G 7/0527; A61G 7/002; A61G 7/018; A61G 7/05; A61G 7/0506; A61G 7/0507; A61G 9/006; A61G 2203/44; G01G 19/44; G01G 19/445; G01G 19/52; G01G 23/14; G01G 19/415; G01G 23/01
See application file for complete search history.

(56) References Cited

U.S. PATENT DOCUMENTS 3,096,061 A   7/1963  Bertell
3,217,818 A   11/1965 Engelsher et al.
(Continued)

FOREIGN PATENT DOCUMENTS

WO   WO 2014/151577   * 9/2015 ............. A61G 7/002

OTHER PUBLICATIONS

"Description" section of WO 2014151577, from the EPO website, Dec. 20, 2017.*
(Continued)

*Primary Examiner* — Randy Gibson
(74) *Attorney, Agent, or Firm* — Barnes & Thornburg LLP

(57) ABSTRACT

A patient support apparatus includes a controller operable to determine the true patient weight by detecting the net weight change of the patient supported on the patient support apparatus. The controller is configured to automatically detect and distinguish the addition or removal of non-patient loads from patient-related loads by determining the rate of weight change of each weight event signals. The controller is further configured to determine the net weight change of the patient by automatically updating a net weight of the non-patient loads on the patient support apparatus.

25 Claims, 9 Drawing Sheets

(51) Int. Cl.
*G01G 23/01* (2006.01)
*G01G 19/415* (2006.01)

(52) U.S. Cl.
CPC .......... *G01G 19/415* (2013.01); *G01G 23/01* (2013.01); *A61G 2203/44* (2013.01)

(56) References Cited

U.S. PATENT DOCUMENTS

| | | | |
|---|---|---|---|
| 3,876,018 | A | 4/1975 | Mracek et al. |
| 4,015,677 | A | 4/1977 | Silva et al. |
| 4,023,633 | A | 5/1977 | Swersey et al. |
| 4,363,368 | A | 12/1982 | Paddon et al. |
| 4,551,882 | A | 11/1985 | Swersey et al. |
| 4,601,356 | A | 7/1986 | Muccillo |
| 4,751,754 | A | 6/1988 | Bailey et al. |
| 4,953,244 | A | 9/1990 | Koerber, Sr. et al. |
| 5,131,103 | A | 7/1992 | Thomas et al. |
| 5,245,718 | A | 9/1993 | Krauska et al. |
| 5,276,432 | A * | 1/1994 | Travis .................. A61B 5/1115 177/144 |
| 5,393,938 | A * | 2/1995 | Bumbalough ....... G01G 19/445 177/144 |
| 5,808,552 | A | 9/1998 | Wiley et al. |
| 5,823,278 | A * | 10/1998 | Geringer .............. G01G 19/445 177/144 |
| 5,831,221 | A | 11/1998 | Geringer et al. |
| 5,859,390 | A | 1/1999 | Stafford et al. |
| 5,861,582 | A | 1/1999 | Flanagan et al. |
| 5,906,016 | A | 5/1999 | Ferrand et al. |
| 6,067,019 | A | 5/2000 | Scott |
| 6,092,838 | A | 7/2000 | Walker |
| 6,133,837 | A | 10/2000 | Riley |
| 6,208,250 | B1 | 3/2001 | Dixon et al. |
| 6,320,510 | B2 | 11/2001 | Menkedick et al. |
| 6,438,776 | B2 | 8/2002 | Ferrand et al. |
| 6,469,263 | B1 | 10/2002 | Johnson |
| 6,481,688 | B1 | 11/2002 | Welling et al. |
| 6,560,798 | B2 | 5/2003 | Welling et al. |
| 6,668,408 | B2 | 12/2003 | Ferrand et al. |
| 6,680,443 | B2 | 1/2004 | Dixon |
| 6,761,344 | B2 | 7/2004 | Welling et al. |
| 6,791,460 | B2 | 9/2004 | Dixon et al. |
| 6,793,279 | B2 | 9/2004 | Hoffman et al. |
| 6,829,796 | B2 | 12/2004 | Salvatini et al. |
| 6,907,630 | B2 | 6/2005 | Treon |
| 6,924,441 | B1 | 8/2005 | Mobley et al. |
| 7,176,391 | B2 | 2/2007 | Metz et al. |
| 7,281,284 | B2 | 10/2007 | Sims, Jr. |
| 7,310,839 | B2 | 12/2007 | Salvatini et al. |
| 7,335,839 | B2 | 2/2008 | Metz et al. |
| 7,459,645 | B2 | 12/2008 | Skinner et al. |
| 7,469,436 | B2 | 12/2008 | Meyer et al. |
| 7,478,446 | B2 | 1/2009 | Sims, Jr. |
| 7,557,718 | B2 | 7/2009 | Petrosenko et al. |
| 7,600,434 | B2 | 10/2009 | Bak |
| 7,681,260 | B2 | 3/2010 | Hallock et al. |
| 7,698,765 | B2 | 4/2010 | Bobey et al. |
| 7,714,238 | B2 | 5/2010 | Skinner et al. |
| 7,818,831 | B2 | 10/2010 | Mahdjoubi |
| 7,834,768 | B2 | 11/2010 | Dixon et al. |
| 7,937,791 | B2 | 5/2011 | Meyer et al. |
| 7,973,666 | B2 | 7/2011 | Petrosenko et al. |
| 7,978,084 | B2 | 7/2011 | Dixon et al. |
| 7,986,242 | B2 | 7/2011 | Dixon et al. |
| 8,056,950 | B2 | 11/2011 | Souke et al. |
| 8,112,836 | B2 | 2/2012 | Tesar et al. |
| 8,146,191 | B2 | 4/2012 | Bobey et al. |
| 8,196,240 | B2 | 6/2012 | Meyer et al. |
| 8,258,963 | B2 | 9/2012 | Dixon et al. |
| 8,261,381 | B2 | 9/2012 | Hallock et al. |
| 8,266,743 | B2 | 9/2012 | Jones et al. |
| 8,344,860 | B2 | 1/2013 | Collins, Jr. et al. |
| 8,400,311 | B2 | 3/2013 | Dixon et al. |
| 8,432,287 | B2 | 4/2013 | O'Keefe et al. |
| 8,464,380 | B2 | 6/2013 | Bobey et al. |
| 8,525,682 | B2 | 9/2013 | Dixon et al. |
| 8,537,008 | B2 | 9/2013 | Tallent et al. |
| 8,593,284 | B2 | 11/2013 | Tallent et al. |
| 8,598,893 | B2 | 12/2013 | Camus |
| 8,717,181 | B2 | 5/2014 | Tallent et al. |
| 8,745,788 | B2 | 6/2014 | Bhai |
| 8,830,070 | B2 | 9/2014 | Dixon et al. |
| 8,844,079 | B2 | 9/2014 | Skinner et al. |
| 8,847,756 | B2 | 9/2014 | Tallent et al. |
| 8,921,717 | B2 | 12/2014 | Siegel et al. |
| 8,959,680 | B2 | 2/2015 | Tesar et al. |
| 8,973,186 | B2 | 3/2015 | Bhai |
| 9,220,650 | B2 | 12/2015 | Bobey et al. |
| 2003/0010345 | A1 | 1/2003 | Koblasz et al. |
| 2005/0035871 | A1 | 2/2005 | Dixon et al. |
| 2005/0077861 | A1 | 4/2005 | Treon |
| 2005/0091753 | A1 | 5/2005 | Salvatini et al. |
| 2005/0166324 | A1 | 8/2005 | Dixon et al. |
| 2005/0273940 | A1 | 12/2005 | Petrosenko et al. |
| 2006/0059814 | A1 | 3/2006 | Metz et al. |
| 2006/0089398 | A1 | 4/2006 | Liu et al. |
| 2006/0195986 | A1 | 9/2006 | Hakamiun et al. |
| 2007/0094792 | A1 | 5/2007 | Sims |
| 2007/0107948 | A1 | 5/2007 | Metz et al. |
| 2007/0272450 | A1 | 11/2007 | Skinner et al. |
| 2008/0010747 | A1 | 1/2008 | Dixon et al. |
| 2008/0066230 | A1 | 3/2008 | Hallock et al. |
| 2009/0013462 | A1 | 1/2009 | Mahdjoubi |
| 2009/0084609 | A1 | 4/2009 | Skinner et al. |
| 2009/0139032 | A1 | 6/2009 | Bak |
| 2009/0217460 | A1 | 9/2009 | Bobey et al. |
| 2009/0270770 | A1 | 10/2009 | Petrosenko et al. |
| 2010/0308846 | A1 | 12/2010 | Camus |
| 2011/0010858 | A1 | 1/2011 | Tesar et al. |
| 2011/0037597 | A1 | 2/2011 | Dixon et al. |
| 2011/0094031 | A1 | 4/2011 | Tesar et al. |
| 2014/0080413 | A1 * | 3/2014 | Hayes .................. H04B 5/0037 455/41.1 |
| 2014/0124273 | A1 | 5/2014 | Receveur et al. |
| 2016/0022218 | A1 * | 1/2016 | Hayes .................... A61G 7/005 600/301 |

OTHER PUBLICATIONS

Bib Data Sheet of WO 2014151577, from the EPO website, Dec. 20, 2017.*
Search Report of Related EP16168185.3-1557, 8 pages.

* cited by examiner

BED WITH AUTOMATIC WEIGHT OFFSET DETECTION AND MODIFICATION

CROSS-REFERENCE TO RELATED APPLICATIONS

The present application claims the benefit, under 35 U.S.C. § 119(e), of U.S. Provisional Application No. 62/157,005, filed May 5, 2015, which is hereby incorporated by reference herein.

BACKGROUND

The present disclosure is related to a patient support apparatus that includes a control system for calculating a true weight of a patient placed on the patient support apparatus. More specifically, the present disclosure is directed to the patient support apparatus having a control system that gathers information regarding non-patient loads placed or removed from the patient support apparatus, automatically updates the net weight of the non-patient loads, determines the net weight change of the patient, and determines the true weight of the patient supported on the patient support apparatus.

In a care facility, caregivers may monitor the weight of a patient to diagnose and treat certain medical conditions. For example, some caregivers may closely monitor a patient's weight loss or weight gain throughout a course of treatment to determine, for example, whether the patient is retaining water. To facilitate making those determinations, some caregivers may use an amount of weight calculated by the patient support apparatus upon which the patient is being supported. However, it is burdensome for the caregivers to remove all non-patient loads from the patient support apparatus before determining the weight of the patient. If previously added non-patient loads are not properly removed from the patient support apparatus at the time of the determination, the weights attributable to that non-patient loads cause incorrect weight readings and result in incorrect diagnosis or treatment to certain medical conditions.

In addition, when a new patient is assigned to the patient support apparatus, the caregivers need to reset the weighing scale of the patient support apparatus prior to the new patient's arrival. Lack of some indication on the patient support apparatus that the patient support apparatus has been reset or requires reset can place an unnecessary burden on the caregivers.

SUMMARY

The present application discloses one or more of the features recited in the appended claims and/or the following features which, alone or in any combination, may comprise patentable subject matter:

According to the present disclosure, a patient support apparatus includes a patient support, a weighing scale, and a controller. The weighing scale comprises a plurality of load cells that supports the patient support. Each load cell is configured to produce a signal indicative of a load on that load cell. The controller is in communication with the plurality of load cells. The controller is configured to determine whether the patient support is supporting a patient and calibrate the weighing scale to zero state. Subsequent to zeroing the weighing scale, the controller is further configured to detect any non-patient weight events on the patient support, determine a net weight change of the patient being supported on the patient support over an occupancy time period, and update an actual weigh of the patient being supported on the patient support.

In some embodiments, the controller is further configured to store an initial weight of the patient in a memory before calibrating the weighing scale to the zero state.

In some embodiments, a non-patient weight event includes any addition or removal of non-patient loads from the patient support.

In some embodiments, a non-patient load comprises any non-patient-related items and any non-biological byproduct of the patient.

In some embodiments, determining the non-patient weight events includes receiving signals provided by the plurality of load cells in response to any load changes detected on the patient support apparatus. The sum of the signals indicates the load supported by the load cells. Determining the non-patient weight events further includes monitoring the signals over the occupancy time period to determine a time rate of change in the load (dl/dt) and comparing the dl/dt to a corresponding biological threshold dl/dt to identify the dl/dt that exceeds a corresponding biological threshold dl/dt. Determining the non-patient weight events further includes determining the load change (dl) of the signal that exceeds the corresponding biological threshold dl/dt to determine the weight of any added or removed non-patient load, storing the weight of the added or removed non-patient load in the memory of the patient support apparatus, and updating a net weight of non-patient loads of the patient support apparatus.

In some embodiments, the signal with the positive dl/dt that exceeds the biological gain threshold dl/dt corresponds to the addition of the non-patient load on the patient support. By contrast, the signal with the magnitude of the negative dl/dt that exceeds the magnitude of the biological loss threshold dl/dt corresponds to the removal of the non-patient load from the patient support.

In some embodiments, determining the net weight change of the patient includes determining a current apparent weight of the patient support apparatus and offsetting the net weight of non-patient loads of the patient support apparatus.

In some embodiments, to determine whether the patient support is supporting the patient further comprises receiving the signals produced by the plurality of load cells and determining at least one of an occupied state and an unoccupied state. The occupied state is indicated when the patient support is determined to be supporting the patient, whereas the unoccupied state is indicated when the patient support is determined not to be supporting the patient.

In some embodiments, the controller is configured to set an initial occupancy state of the patient support apparatus to the unoccupied state and determine a normalized amount of loads on the plurality of load cells as a function of the signals produced by the plurality of load cells. The controller is further configured to set the current occupancy state of the patient support apparatus to the occupied state in response to the normalized amount of loads on the plurality of load cells satisfying an occupied condition. The occupied condition is defined by the normalized amount of loads being greater than an occupied threshold value. The controller is further configured to set the current occupancy state of the patient support apparatus to the unoccupied state in response to the normalized amount of loads on the plurality of load cells satisfying an unoccupied condition. The unoccupied condition is defined by the normalized amount of loads being lower than an unoccupied threshold value.

In some embodiments, the actual weight of the patient supported on the patient support is determined by adding the net weight change of the patient to the initial weight of the patient stored in the memory.

In a second aspect of the present disclosure, a patient support apparatus includes a patient support, a plurality of load cells, one or more indicators, and a controller. Each load cell is configured to produce a signal indicative of a load on that load cell. The controller is in communication with the plurality of load cells and the indicators. The controller is configured to determine whether the patient support is supporting a patient. In response to determining that the patient support is no longer supporting the patient, the controller activates one or more indicators and resets a patient occupancy timer of the patient support apparatus. Subsequent to resetting the patient occupancy timer, the controller deactivates one or more indicators.

In some embodiments, the controller is configured to set an initial occupancy state of the patient support apparatus to an unoccupied state. The controller further determines a normalized amount of loads on a plurality of load cells as a function of the signals produced by the plurality of load cells. In response to the normalized amount of loads on the plurality of load cells satisfying an occupied condition, the controller sets the current occupancy state of the patient support apparatus to the occupied state. The occupied condition being defined by the normalized amount of loads being greater than an occupied threshold value. In response to the normalized amount of loads on the plurality of load cells satisfying an unoccupied condition, the controller further sets the current occupancy state of the patient support apparatus to the unoccupied state. The unoccupied condition being defined by the normalized amount of loads being lower than an unoccupied threshold value.

In some embodiments, the patient support apparatus further includes a timer module in communication with the controller. The timer module is configured to increment one or more timer values for the controller.

In some embodiments, the controller is configured to start a patient absence timer in response to determining that the patient support is not supporting the patient. The controller is further configured to determine whether a current value of the patient absence timer is at least one of greater than or equal to a reference absence timer threshold. If the current value of the patient absence timer reaches the reference absence timer threshold, the controller stops the patient occupancy timer and activates one or more indicators.

In some embodiments, the controller is further configured to receive an indicator reset signal. When the indicator reset signal is received, the controller resets the patient occupancy timer to zero and deactivates one or more indicators.

In some embodiments, the indicator reset signal is produced automatically when the controller detects the activated indicator.

In some embodiments, the indicator reset signal is produced in response to a manual reset input.

In some embodiments, resetting the occupancy time period includes deleting the net weight of non-patient loads and the net weight change of the patient from the memory.

In some embodiments, resetting the occupancy time period includes storing the final net weight of non-patient loads and the final net weight change of the patient in the memory.

In a third aspect of the present disclosure, a patient support apparatus includes a patient support, a weighing scale, a processor, and at least one machine-readable storage medium. The weighing scale comprises a plurality of load cells that supports the patient support. Each load cell is configured to produce a signal indicative of a load on that load cell. At least one machine-readable storage medium includes a plurality of instructions, that in response to being executed by the processor, result in the patient support apparatus starting a patient occupancy timer and calibrating a weighing scale to a zero state, receiving signals produced by the plurality of load cells in response to any load changes detected on the patient support apparatus, and detecting a time rate of change in the load (dl/dt) of each signal exceeding a corresponding biological threshold dl/dt. At least one machine-readable storage medium further includes a plurality of instructions, that in response to being executed by the processor, result in the patient support apparatus determining the load change (dl) of the signal that exceeds the corresponding biological threshold dl/dt to determine the weight of any added or removed non-patient load, storing the weight of the added or removed non-patient load in a memory of the patient support apparatus, updating a net weight of non-patient loads of the patient support apparatus, determining a net weight change of the patient, and finally determining an actual weight of the patient being supported on the patient support.

In some embodiments, the controller is further configured to store an initial weight of the patient in a memory before calibrating the weighing scale to the zero state.

In some embodiments, detecting the signal exceeding a corresponding biological threshold rate includes (i) determining the dl/dt of the signal, (ii) determining whether the signal has a positive dl/dt or a negative dl/dt, and (iii) comparing a positive dl/dt with a biological gain threshold dl/dt, and a negative dl/dt with a biological loss threshold dl/dt.

In some embodiments, the signal with the positive dl/dt exceeding the biological gain threshold dl/dt corresponds to the addition of the non-patient load on the patient support, whereas, the signal with the magnitude of the negative dl/dt exceeding the magnitude of the biological loss threshold dl/dt corresponds to the removal of the non-patient load from the patient support.

In some embodiments, the net weight change of the patient is determined by offsetting the net weight of the non-patient loads from a current apparent weight of the patient support apparatus.

In some embodiments, the actual weight of the patient supported on the patient support is determined by adding the net weight change of the patient to the initial weight of the patient stored in the memory.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
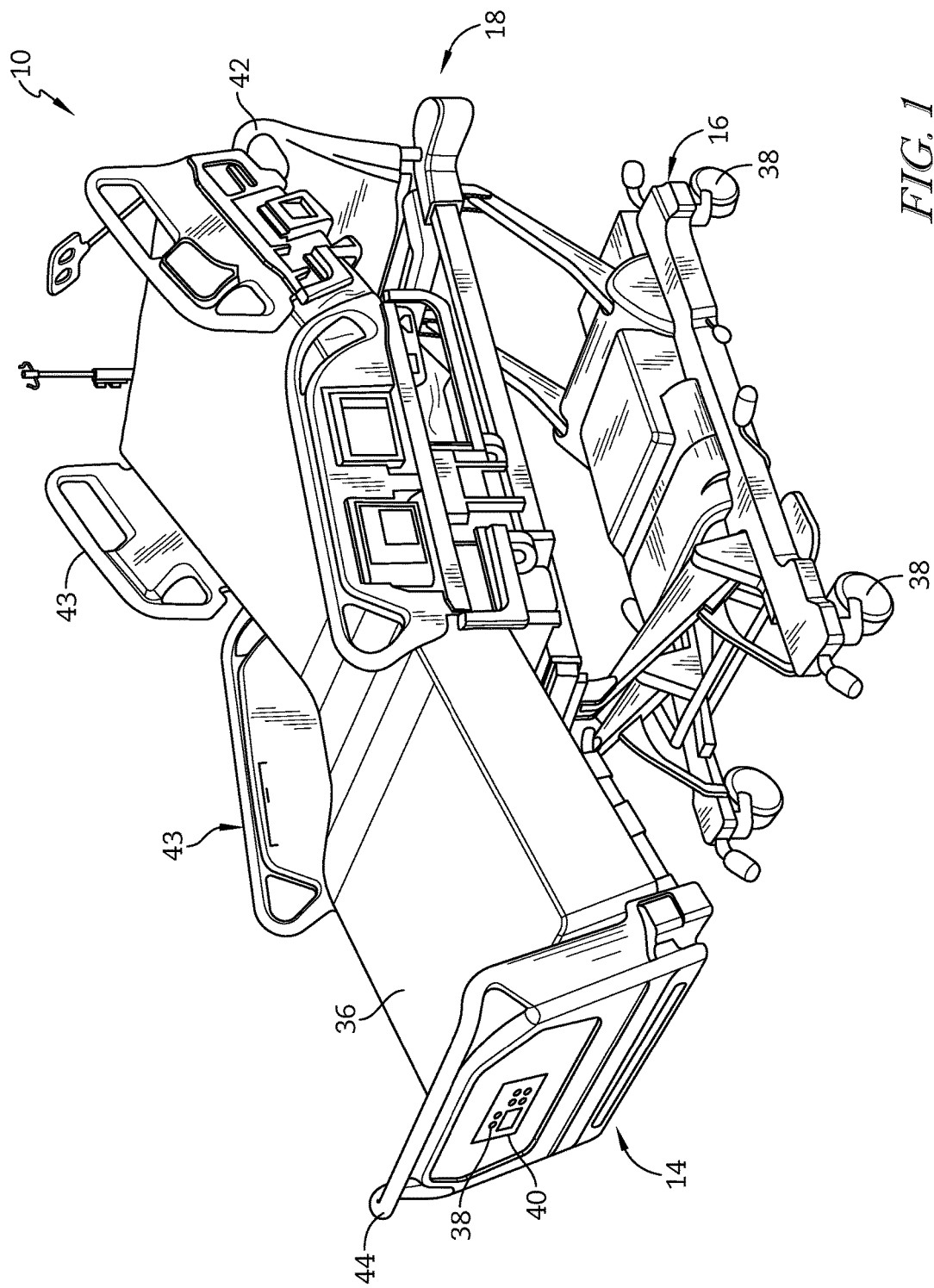
FIG. 1 is a perspective view from the foot end on the patient's left of a patient support apparatus.

An illustrative patient support apparatus embodied as a hospital bed 10 is shown in FIG. 1. The patient support apparatus 10 of FIG. 1 has an indicator 38 on an input panel or control panel 40 that is affixed to the footboard 44 of the patient support apparatus 10. The fixed bed frame 14 includes a base frame 16 with casters 38 and an upper frame 18. The upper frame 18 includes a number of mattress support sections that support a therapy surface 36. The illustrative patient support apparatus 10 of FIG. 1 further detects and compensates for weights attributable to one or more non-patient loads 46 that affect determination of the net weight change of the patient. The weights exerted on the patient support apparatus 10 is measured on a weighing scale 30. The weighing scale 30 is mounted to the upper frame 18 configured to support the therapy surface 36. The weighing scale 30 includes weigh frame 32 and a plurality of load cells 34. The plurality of load cells 34 are positioned between the weigh frame 32 and the base frame 16, wherein each load cell 34a-d is configured to produce a signal indicative of a weight supported by that load cell 34a-d from the weigh frame 32 relative to the base frame 16.

Figure 2:
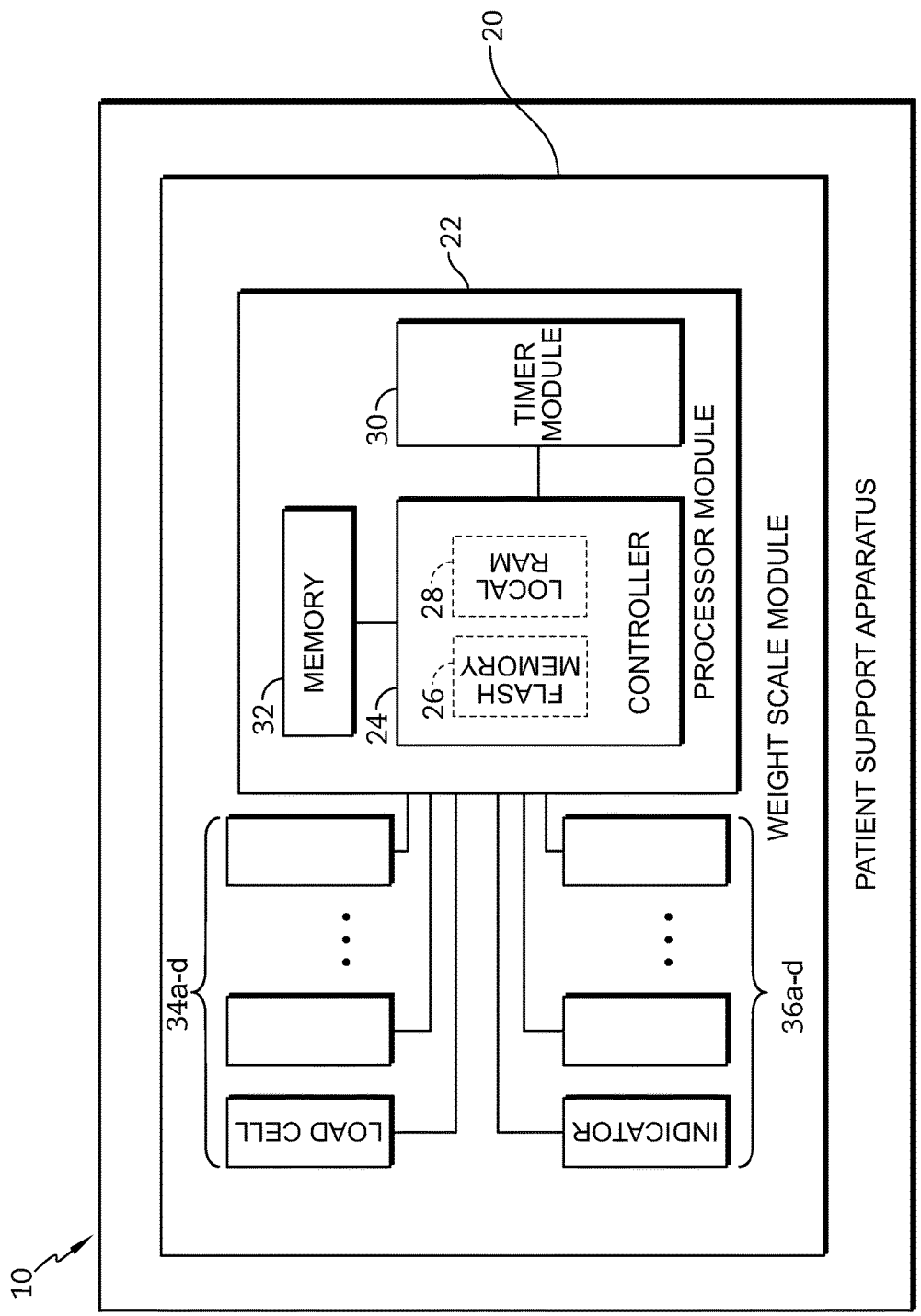
FIG. 2 is a block diagram of a portion of the electrical system of the patient support apparatus of FIG. 5 used to determine a net weight of non-patient loads added or removed from the patient support apparatus.

In one illustrative embodiment shown diagrammatically in FIG. 2, the patient support apparatus 10 includes a weigh scale module 20 configured to automatically update a net weight of non-patient loads 46 for use in determining a net weight change of the patient 12. The weigh scale module 20 includes a processor module 22 that is in communication with each of the load cells 34. The processor module 22 includes a microprocessor-based controller 24 having a flash memory unit 26 and a local random-access memory (RAM) unit 28. The local RAM unit 28 is utilized by the controller 24 to temporarily store information corresponding to features and functions provided by the patient support apparatus 10. More specifically, the controller 24 is configured to adjust the net weight of the non-patient loads 46 on the patient support apparatus 10 based on the signals produced by the load cells 34.

Figure 3:
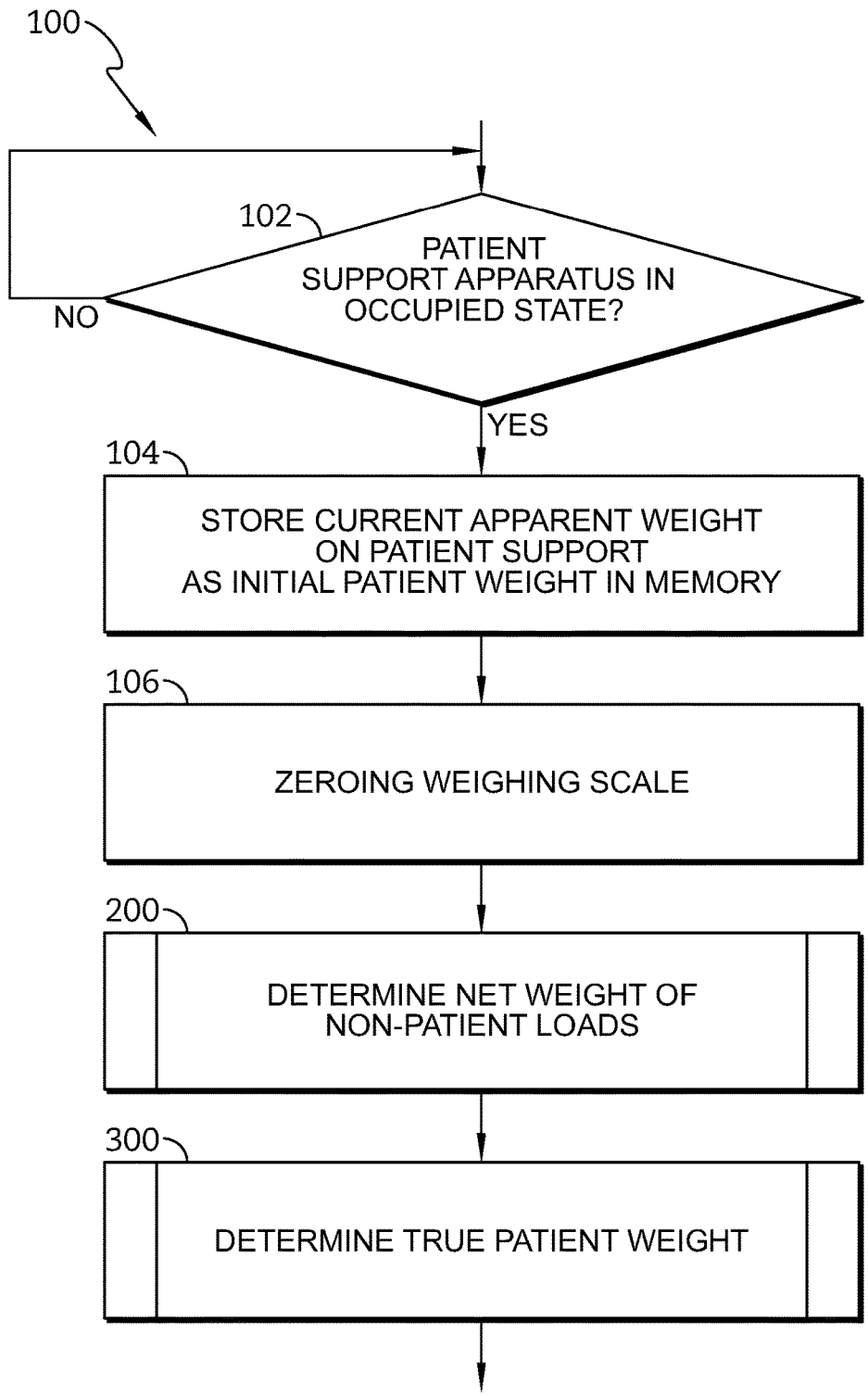
FIG. 3 is a flow chart showing a routine process performed by a processor of the patient support apparatus to determine a net weight change of the patient.

Referring to FIG. 3, a routine process 100 for determining the net weight change of a patient 12 is shown. The routine process 100 illustratively begins at decision step 102 where the controller 24 is operable to check an occupancy state of the patient support apparatus 10.

Figure 7:
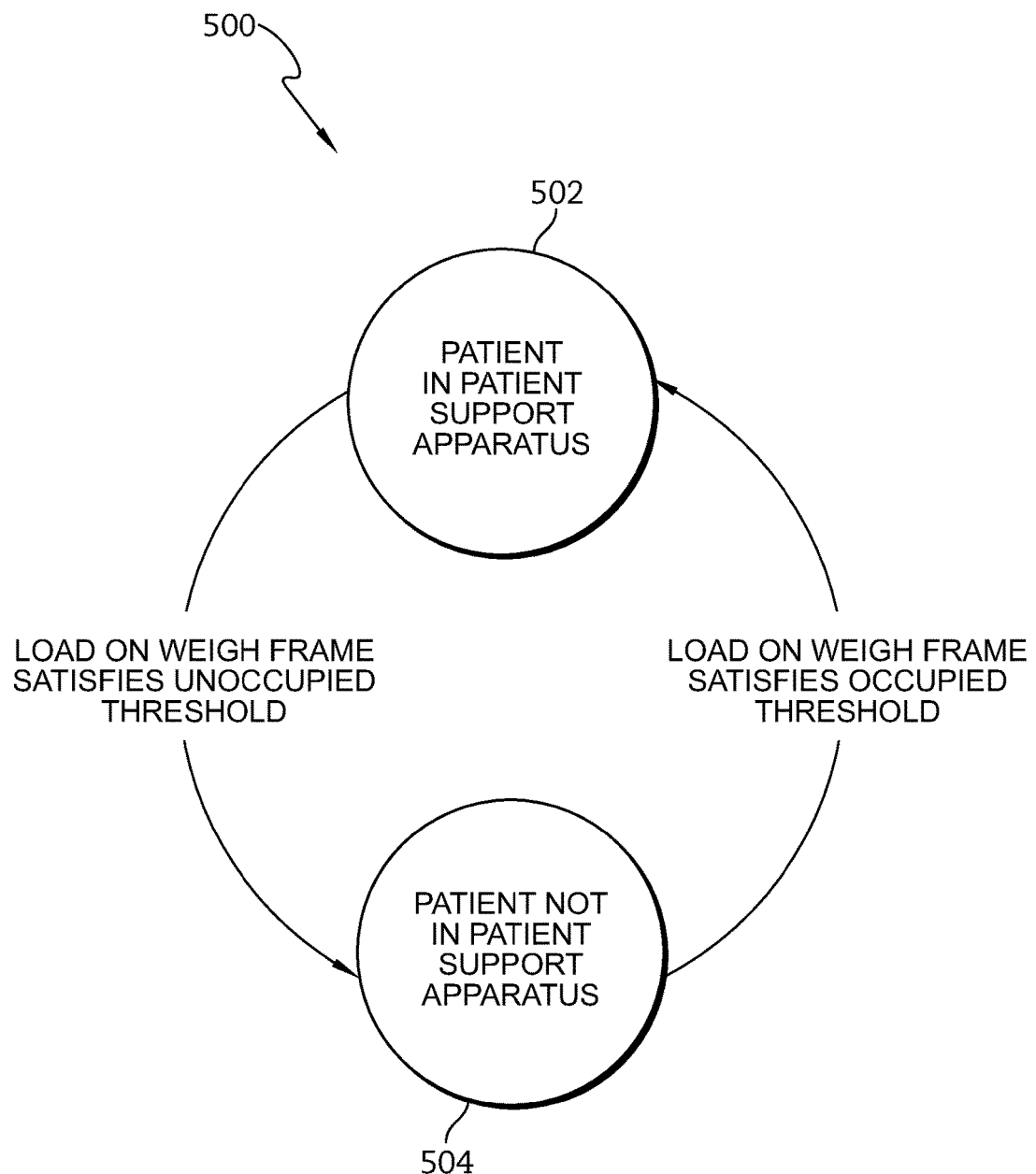
FIG. 7 is a state diagram illustrating one embodiment of a control sub-routine for determining whether the patient is being supported by the patient support apparatus that forms one part of the routine process of FIG. 3 and the initial process of FIG. 6.

FIG. 7 is a state diagram 500 illustrating one embodiment of the occupancy states of the patient support apparatus 10 as determined by the controller 24. As described above, the controller 24 determines whether or not a patient 12 is being supported by the therapy surface 36 and updates the occupancy state accordingly. In one embodiment, the controller 24 determines two discrete states of occupancy. An occupied state 502 indicates that the patient 12 is in the patient support apparatus 10 and an unoccupied state 504 indicates that the patient 12 is not in the patient support apparatus 10. It should be understood that while the illustrative embodiment of FIG. 7 shows two discrete occupancy states, any number of occupancy states are contemplated by this disclosure. For example, the controller 24 may determine that the patient is both partially in and partially out of the patient support apparatus 10 (e.g., the patient is sitting on the edge of the patient support apparatus 10) at any given point of time.

The controller 24, in one embodiment, initializes the occupancy state of the patient support apparatus 10 to the unoccupied state 504. After initialization, in response to determining that a normalized amount of loads on the weigh frame 32 satisfies a predetermined occupied threshold value, the controller 24 updates the occupancy state of the patient support apparatus 10 to the occupied state 502. For example, in one embodiment, the controller 24 updates the occupancy state of the patient support apparatus 10 to the occupied state 502 in response to determining that the normalized amount of loads on the weigh frame 32 meets or exceeds a predetermined threshold, for example, 65 pounds.

Subsequent to updating the occupancy state to the occupied state 502, in response to determining that the normalized amount of loads on the weigh frame 32 satisfies a predetermined unoccupied threshold value, the controller 24 updates the occupancy state of the patient support apparatus 10 to the unoccupied state 504. For example, in the illustrated embodiment, the controller 24 updates the occupancy state of the patient support apparatus 10 to the unoccupied state 504 in response to determining that the normalized amount of loads on the weigh frame 32 meets or falls below a predetermined threshold, for example, 30 pounds.

Figure 4:
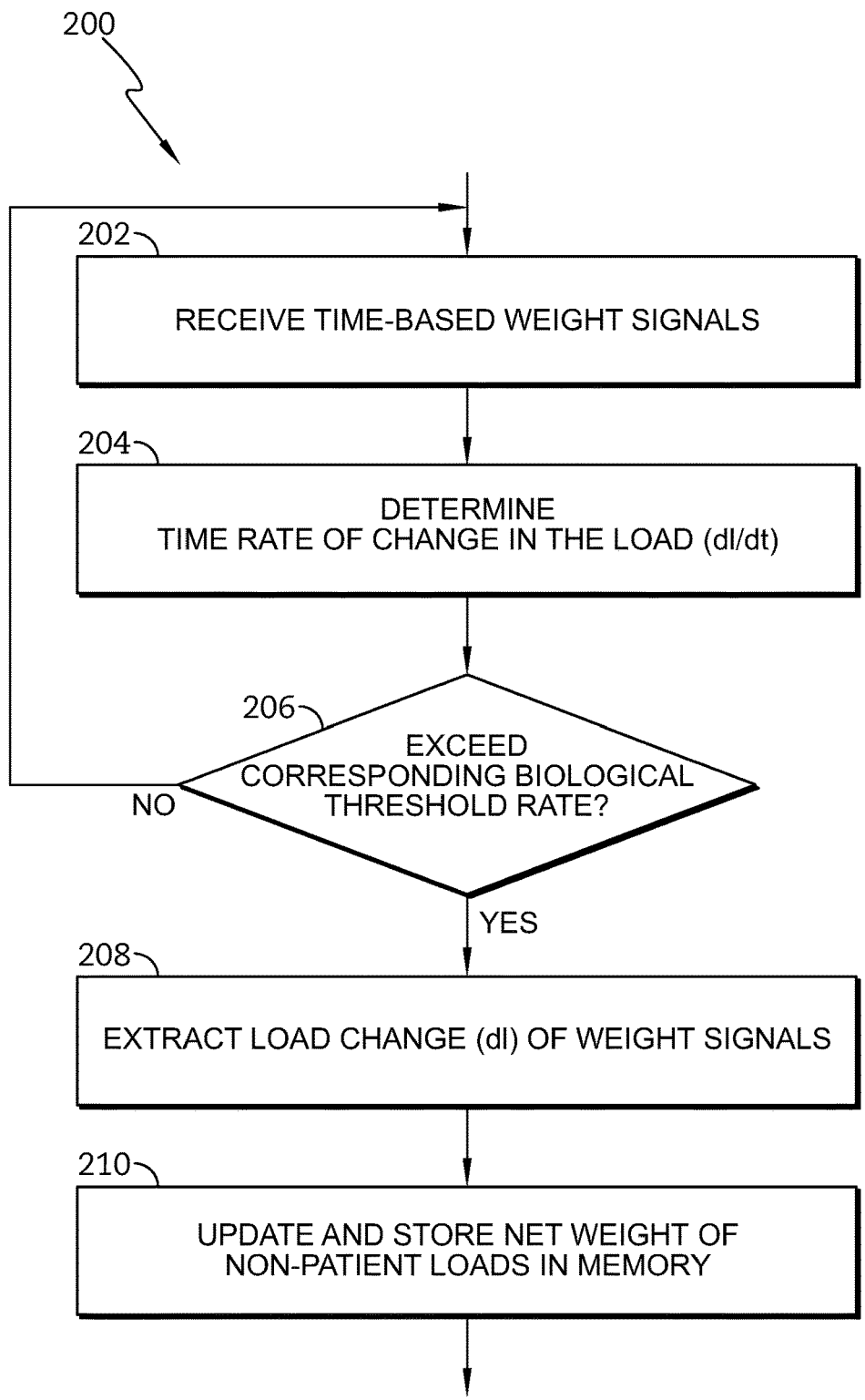
FIG. 4 is a flow chart showing a sub-routine process for tracking non-patient weight events and determining the net weight of non-patient loads that forms one part of the routine process of FIG. 3.

Referring back to FIG. 3, if the controller 24 determines that the patient 12 is supported on the patient support apparatus 10, the routine process 100 advances to step 104 in which the controller 24 stores the current apparent weight of the patient support as an initial patient weight ($W_i$) in memory 32. After storing the initial patient weight ($W_i$), the routine process 100 proceeds to step 106 where the controller 24 calibrates the weighing scale 30 to a zero state. The routine process 100, subsequent to zeroing the weighing scale 30, proceeds to step 200. At step 200, the controller 24 determines the net weight of the non-patient loads 46 as shown in FIG. 4.

To determine the net weight of the non-patient loads 46, the controller 48 first determines whether each time-based weight event signal corresponds to the non-patient load 46 or patient-related load 52. The non-patient loads 46 include any non-patient-related items and any non-biological byproduct of the patient 12 and do not affect the weight of the patient 12. The patient-related loads 52 affect the weight of the patient 12 and include any intake or output substances by the patient 12. For example, the patient-related loads 52 include any biological byproduct of the patient 12 and any medical treatment fluids that are taken in or produced out of the patient's body.

When the controller 24 receives the time-based weight event signals, the controller 24 determines the time rate of change in the load (dl/dt) of each weight event signal and compares it to a corresponding biological threshold dl/dt: biological gain threshold dl/dt (+BT) or biological loss threshold dl/dt (−BT). The biological gain threshold dl/dt (+BT) corresponds to the weight gain of the patient 12 and the biological loss threshold dl/dt (−BT) corresponds to the weight loss of the patient 12.

The positive dl/dt is compared to the biological gain threshold dl/dt (+BT). If the positive dl/dt of the time-based weight signal is greater than the biological gain threshold dl/dt (+BT), the routine process 100 proceeds to step 208. At step 208, the controller determines the load change (+dl) of the time-based weight event signal which corresponds to the weight of the non-patient load 46 added to the patient support apparatus 10. Similarly, the negative dl/dt is compared to the biological loss threshold dl/dt (−BT). If the controller 24 determines that the negative dl/dt of the time-based weight signal 48 has a greater magnitude and thus a steeper slope than the biological loss threshold rate (−BT), the routine process 100 also proceeds to step 208. At step 208, the controller 24 determines the load change (−dl) of the time-based weight event signal which corresponds to the weight of the non-patient load 46 removed from the patient support apparatus 10. The controller 24 constantly updates and stores the net weight of the non-patient loads 46 in memory 32.

Figure 5:
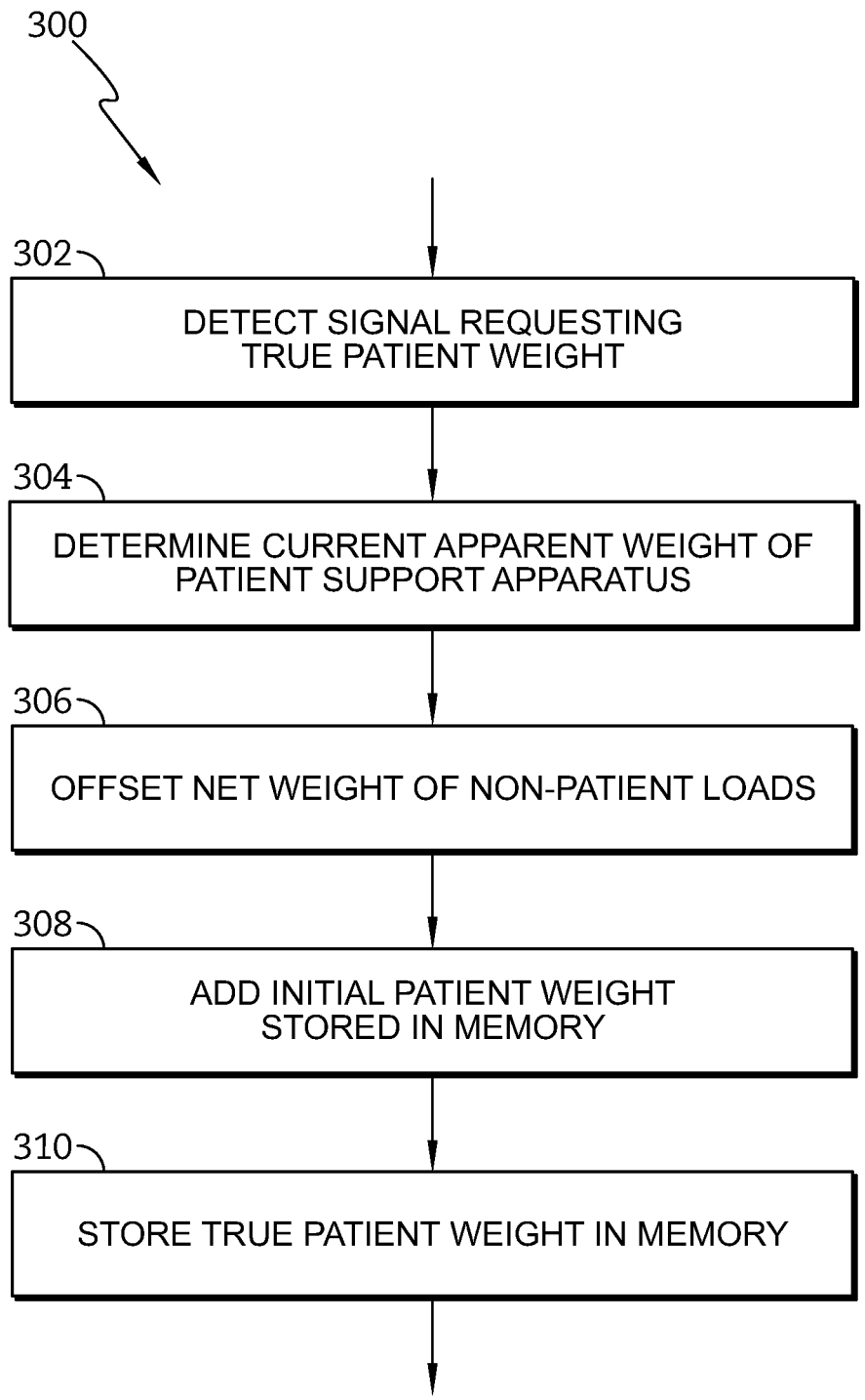
FIG. 5 is a flow chart showing a sub-routine process for determining the net weight change of the patient that forms one part of the routine process of FIG. 3.

Subsequent to determining the net weight of the non-patient loads 46, the routine process 100 proceeds to step 300 to determine the true patient weight ($W_{PT}$). As shown in FIG. 5, the controller 24 detects the signal requesting the true patient weight ($W_{PT}$) at step 302. The controller 24 first determines the current apparent weight of the patient support apparatus 10. Subsequently, the controller 24 recalls the net weight of the non-patient loads 46 that was determined and stored in the memory 32 at step 210. The controller 24 offsets the net weight of the non-patient loads 46 from the current apparent weight of the patient support apparatus 10. This value corresponds to a net weight change of the patient 12 supported on the patient support. The controller 24 then recalls the initial patient weight ($W_i$) stored in memory 43 at step 104. To determine the true patient weight ($W_{PT}$), the controller 24 adds the initial patient weight ($W_i$) to the net weight change of the patient 12. The controller 24 further updates and stores the true patient weight ($W_{PT}$) in the memory 32.

Figure 6:
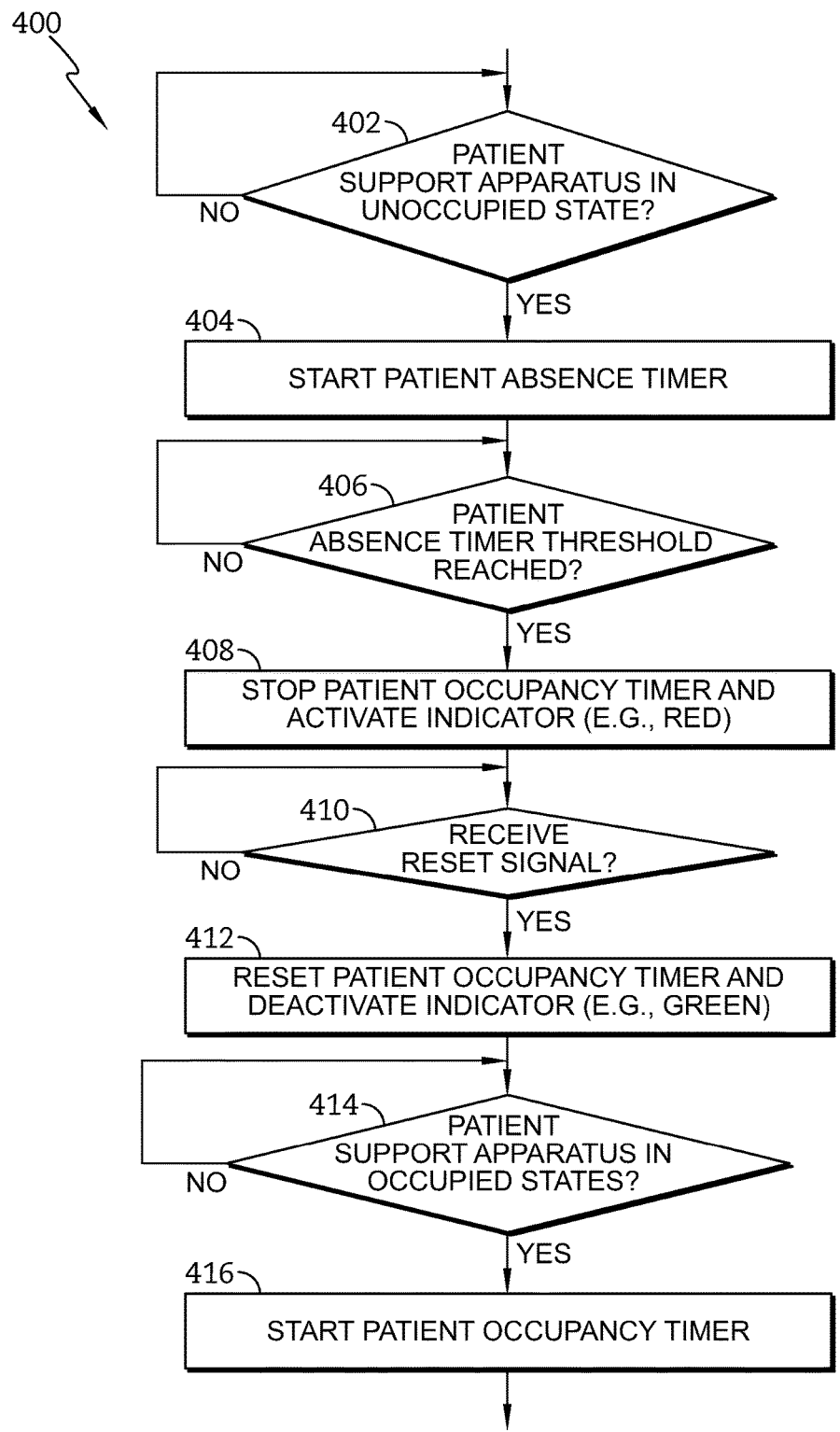
FIG. 6 is a flow chart showing an initial process performed by the processor of the patient support apparatus to reset and start a patient occupancy timer for a new patient.

In one illustrative embodiment shown in FIG. 6, an initial process 400 for resetting the weighing scale 30 of the patient support apparatus 10 is shown. The initial process 400 illustratively begins at decision step 402 where the controller 24 is operable to check an occupancy state of the patient support apparatus 10. If the controller 24 determines that the patient 12 is not supported on the patient support apparatus 10, the initial process 400 proceeds to step 404 where the controller 24 starts a patient absence timer 54. When the patient absence timer 54 reaches the reference absence timer threshold, the controller 24 stops the patient occupancy timer 56 and activates one or more indicators 38. For example, in one embodiment, the LED indicator 38 is placed on the input panel or control panel 40. When the indicator 38 is activated, the LED indicator 38 on the input panel or control panel 40, for example, changes from green to red. When the indicator 38 is activated, an indicator reset signal is produced to reset the patient occupancy timer 56. In one embodiment, the indicator reset signal is produced by the input panel or control panel 40 when the caretakers manually reset on the input panel or control panel 40 in response to the red LED indicator 38. In another embodiment, the indicator reset signal is produced automatically when the indicator 38 is activated. When the controller 24 receives the indicator reset signal, the controller 24 resets and initializes the patient occupancy timer 56 to time zero and deactivates the indicator 38. When the indicator 38 is deactivated, the LED indicator 38 on the input panel or control panel 40, for example, changes from red to green.

The controller 24, subsequent to deactivating the indicator 38, determines whether the patient 12 is supported on the patient support apparatus 10. If the controller 24 determines that the patient 12 is supported on the patient support apparatus 10, the initial process 400 proceeds to step 416 where the controller 24 starts the patient occupancy timer 56.

The loads on the therapy surface 36 of the patient support apparatus 10 as a function of patient's occupancy time W(t) is shown in FIGS. 8-12. A time-based weight event function illustrates signals indicative of any loads added or removed from the therapy surface 36 of the patient support apparatus 10. As described above, the controller 24 initializes the occupancy state of the patient support apparatus 10 to the unoccupied state 504. The controller 24 recognizes a new patient 12 on the patient support apparatus 10 at $t_0$ in response to the normalized amount of weight on the weight frame 32 satisfying the predetermined occupied threshold value. Subsequently, the controller 24 updates occupancy state of the patient support apparatus 10 to the occupied state 502 and starts the patient occupancy timer 56 at $t_0$ in FIGS. 8-11. The controller 24 sets the corresponding initial weight ($W_0$) at $t_0$ to zero. This is referred to as "zeroing" the weighing scale 30.

Subsequent to zeroing the weighing scale 30 at $t_0$, throughout the course of the patient's occupancy time period, the controller 24 routinely detects any load changes on the plurality of load cells 34 of the weighing scale 30. The controller 24 determines the time rate of change in the load (dl/dt) of each weight event signal. The controller 24 further determines whether the weight event signal corresponds to the addition or removal of the non-patient loads 46. As described above, the controller 24 determines whether the load change (dl) corresponds to the non-patient load 46 by comparing the dl/dt of the weight event signal and the corresponding biological threshold dl/dt. Specifically, the controller 24 determines the addition or removal of non-patient loads 46 by determining whether (i) a positive dl/dt is greater than the biological gain threshold dl/dt or (ii) a negative dl/dt has a more severe slope than the biological loss threshold dl/dt.

Figure 8:
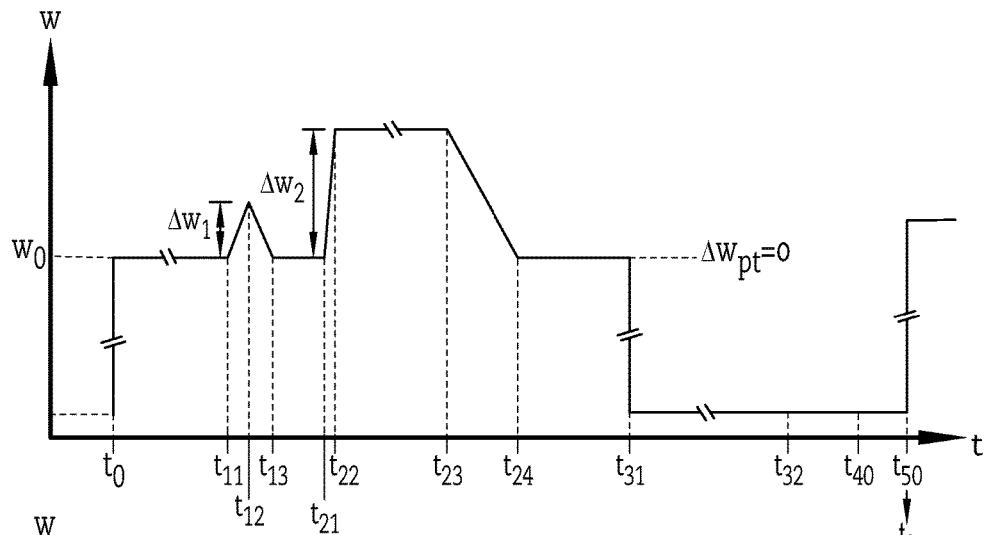
FIG. 8 is a graphical view of a time-based step function that illustrates signals indicative of addition and removal of the non-patient loads on the patient support apparatus when there is no changes in the weight of the patient over the occupancy time period.
Figure 9:
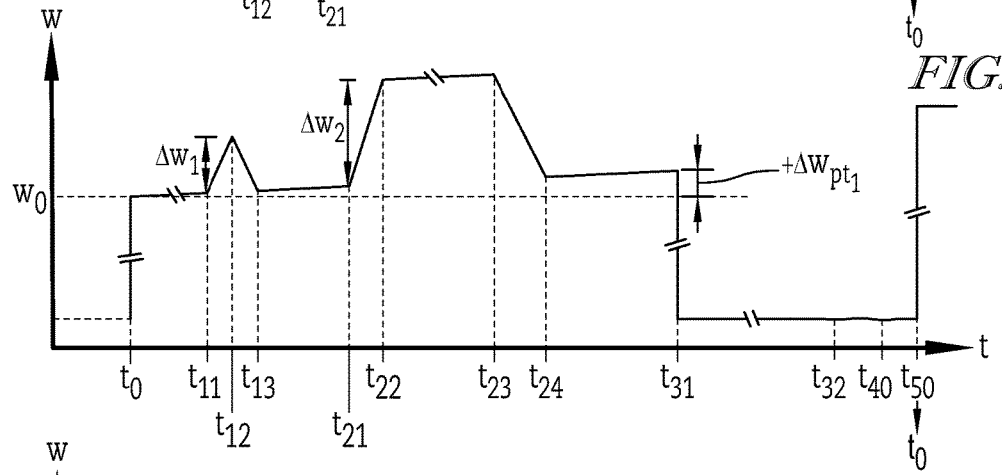
FIG. 9 is a graphical view of a time-based step function that illustrates signals indicative of addition and removal of the non-patient loads on the patient support apparatus when the patient gradually gains weight over the occupancy time period.
Figure 10:
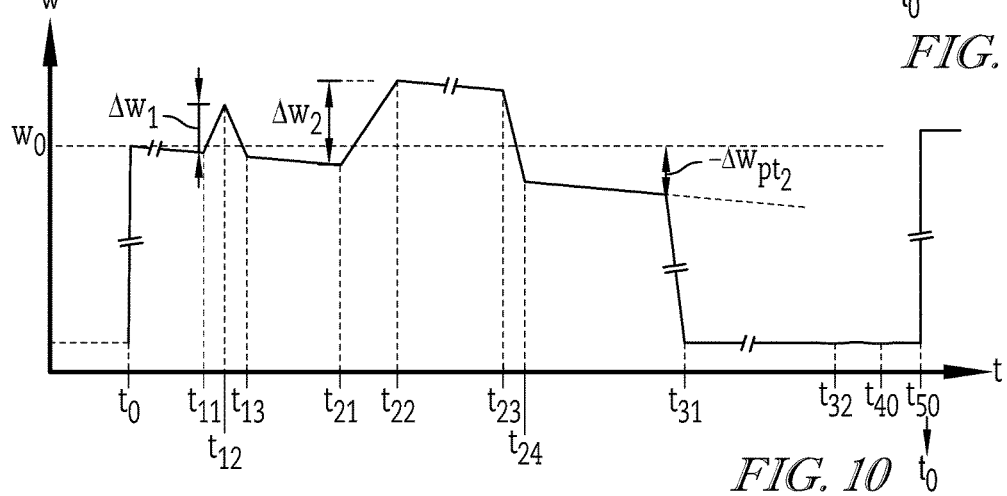
FIG. 10 is a graphical view of a time-based step function that illustrates signals indicative of addition and removal of the non-patient loads on the patient support apparatus when the patient gradually loses weight over the occupancy time period.

FIG. 8 is an exemplary graphical illustration of the weight event signals indicative of addition and removal of non-patient loads 46 on the patient support apparatus 10 when there are no changes in the weight of the patient 12 ($\Delta W_{PT}$=0) over the course of the patient's occupancy time period. Similarly, FIGS. 9 and 10 are other exemplary graphical illustrations of the weight event signals indicative of addition and removal of non-patient loads 46 on the patient support apparatus 10. However, unlike FIG. 8, the patient 12 either gains weight (+$\Delta W_{PT}$) in FIG. 9 or loses weight (−$\Delta W_{PT}$) in FIG. 10 over the course of the patient's occupancy time period.

Referring to the weight event signals between $t_{11}$ and $t_{13}$ of FIG. 8-10, the controller 24 determines that the positive dl/dt between $t_{11}$ to $t_{12}$ is greater than the biological gain threshold dl/dt. Accordingly, the controller 24 concludes that the weight event signal from $t_{11}$ to $t_{12}$ corresponds to the addition of the non-patient load 46 and stores the weight of the added non-patient load 46 (+$W_1$) in the memory 32. The controller 24 further determines that the negative dl/dt between $t_{12}$ and $t_{13}$ has a more severe slope than the biological loss threshold dl/dt. Accordingly, the controller 24 concludes that the weight event signal from $t_{12}$ to $t_{13}$ corresponds to the removal of the non-patient load 46 and stores the weight of the removed non-patient load 46 (−$\Delta W_1$) in the memory 32. Therefore, the weight event signals between $t_{11}$ and $t_{13}$ of FIG. 8 represent a non-patient load 46 having a weight of $W_1$. The non-patient load 46 is temporarily added on the therapy surface 36 of the patient support apparatus 10 at $t_{11}$ and is removed from the therapy surface 36 at $t_{13}$. The temporary addition of a non-patient load 46, for example, occurs when the caretaker briefly leans on the therapy surface 36 to treat the patient 12 on the patient support apparatus 10.

Now referring to the weight event signals between $t_{21}$ to $t_{24}$ of FIG. 8-10, the weight events signal represents a load having a weight of $W_2$. As described above, the controller 24 routinely determines the dl/dt throughout the patient's occupancy time period. Between $t_{21}$ to $t_{22}$, the controller 24 determines that the positive dl/dt is greater than the biological gain threshold dl/dt. Accordingly, the controller 24 determines that the weight event signal from $t_{21}$ to $t_{22}$ corresponds to the addition of the non-patient load 46 and stores the weight of the added non-patient load 46 (+$\Delta W_2$) in the memory 32. Between $t_{23}$ and $t_{24}$, the controller 24 determines that the negative dl/dt has a greater magnitude and thus a steeper slope than the biological loss threshold dl/dt. Accordingly, the controller 24 determines that the weight event signal from $t_{23}$ to $t_{24}$ corresponds to the removal of the non-patient load 46 and stores the weight of the removed non-patient load 46 (−$\Delta W_2$) in the memory 32. The signals between $t_{21}$ to $t_{24}$, for example, occurs when a visiting grandchild is sitting on the patient support apparatus 10 with the patient for extended period of time ($t_{21}$ to $t_{24}$). No weight changes or movements on the patient support apparatus 10 are observed between $t_{21}$ to $t_{22}$, $t_{22}$ to $t_{23}$, and $t_{24}$ to $t_{31}$ as indicated by the zero rate of change (dl/dt=0).

At $t_{31}$ of FIG. 8-10, the controller 24 determines that the current apparent weight of the patient support apparatus 10 is less than the predetermined occupied threshold value. Accordingly, the controller 24 starts the patient absence timer 54 at $t_{31}$. Subsequently, the reference absence timer threshold ($\Delta t_{THR\_ABS}$) is reached at $t_{32}$, and the controller 24 stops the patient occupancy timer 56 and activates one or more indicators 38 at $t_{32}$.

At $t_{40}$ of FIG. 8-10, the controller 24 receives the indicators reset signal of one or more indicators 38, resets the patient occupancy timer 56 to zero, and deactivate one or more indicators 38. The controller 24 holds the patient occupancy timer 56 until the controller 24 detects the new patient 12. The new patient 12 is detected when the current apparent weight exceeds the predetermined occupied threshold value. At $t_{50}$, the controller 24 detects the new patient. Subsequently, the controller 24 starts the patient occupancy timer 56 at $t_{50}$, which is new $t_0$. The controller 24 starts the routine process 100 to determine the true weight of the new patient 12 by determining the net weight of the non-patient loads 46 on the patient support apparatus 10.

Figure 11:
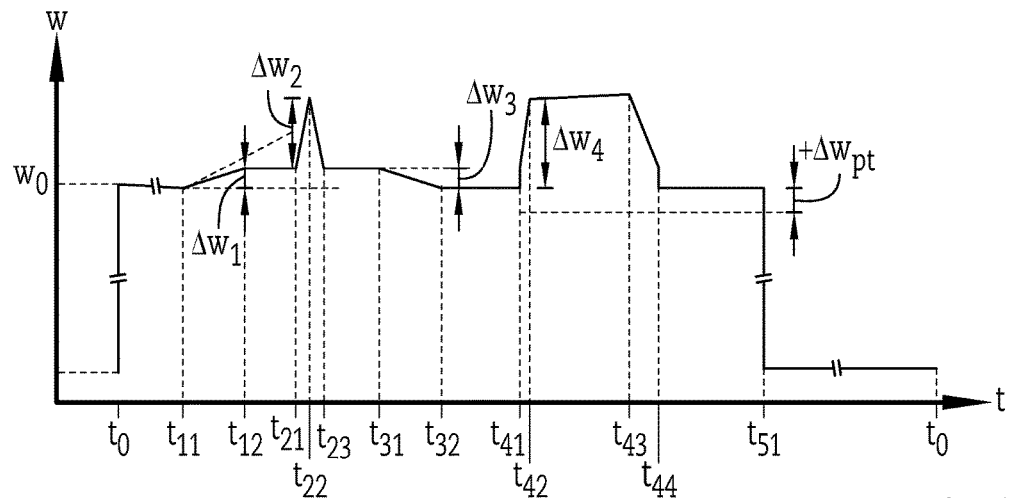
FIG. 11 is a graphical view of a time-based step function that illustrates signals indicative of addition and removal of the non-patient and patient-related loads on the patient support apparatus when the patient gradually gains weight over the occupancy time period.

Another exemplary graphical illustration of the signals indicative of addition and removal of non-patient loads 46 on the patient support apparatus 10 over the patient's occupancy time period is shown in FIG. 11. First, referring to the weight event signal between $t_{11}$ and $t_{12}$, the controller 24 determines that the positive dl/dt between $t_{11}$ to $t_{12}$ is less than the biological gain threshold dl/dt. Accordingly, the controller 24 concludes that the weight event signal from $t_{11}$ to $t_{12}$ corresponds to the addition of the patient-related load 52 (+$\Delta W_1$). An example of the addition of the patient-related loads 52 is an infusion of intravenous fluids into the patient 12.

Subsequently, the controller 24 determines that the positive dl/dt between $t_{21}$ to $t_{22}$ is greater than the biological gain threshold dl/dt. Accordingly, the controller 24 concludes that the weight event signal from $t_{21}$ to $t_{22}$ corresponds to the addition of the non-patient load 46 and stores the weight of the added non-patient load 46 (+$\Delta W_2$) in the memory 32. The controller 24 further determines that the negative dl/dt between $t_{22}$ and $t_{23}$ has a more severe slope than the biological loss threshold dl/dt. Accordingly, the controller 24 concludes that the weight event signal from $t_{22}$ to $t_{23}$ corresponds to the removal of the non-patient load 46 and stores the weight of the removed non-patient load 46 (−$\Delta W_2$) in the memory 32.

Between $t_{31}$ and $t_{32}$ of FIG. 11, the controller 24 determines that the negative dl/dt has a less severe slope than the biological loss threshold dl/dt (−BT). Accordingly, the controller 24 concludes that the weight event signal from $t_{31}$ to $t_{32}$ corresponds to the removal of the patient-related load 52 (−$\Delta W_3$), such as urine drainage.

Now referring to the weight event signals between $t_{41}$ to $t_{44}$ of FIG. 11, the weight event signals represent the addition and removal of the load having a weight of $W_4$. Between $t_{41}$ to $t_{42}$, the controller 24 determines that the positive dl/dt is greater than the biological gain threshold dl/dt. Accordingly, the controller 24 determines that the weight event signal from $t_{41}$ to $t_{42}$ corresponds to the addition of the non-patient load 46 and stores the weight of the added non-patient load 46 (+$\Delta W_4$) in the memory 32. Between $t_{43}$ and $t_{44}$, the controller 24 determines that the negative dl/dt has a greater magnitude and thus a steeper slope than the biological loss threshold dl/dt. Accordingly, the controller 24 determines that the weight event signal from $t_{43}$ to $t_{44}$ corresponds to the removal of the non-patient load 46 and stores the weight of the removed non-patient load 46 (−$\Delta W_4$) in the memory 32. No weight changes or movements on the patient support apparatus 10 are observed between $t_{21}$, $t_{23}$ and $t_{31}$, $t_{32}$ and $t_{41}$, $t_{42}$ and $t_{43}$, and $t_{44}$ and $t_{51}$ as indicated by the zero rate of change (dl/dt=0).

Figure 12:
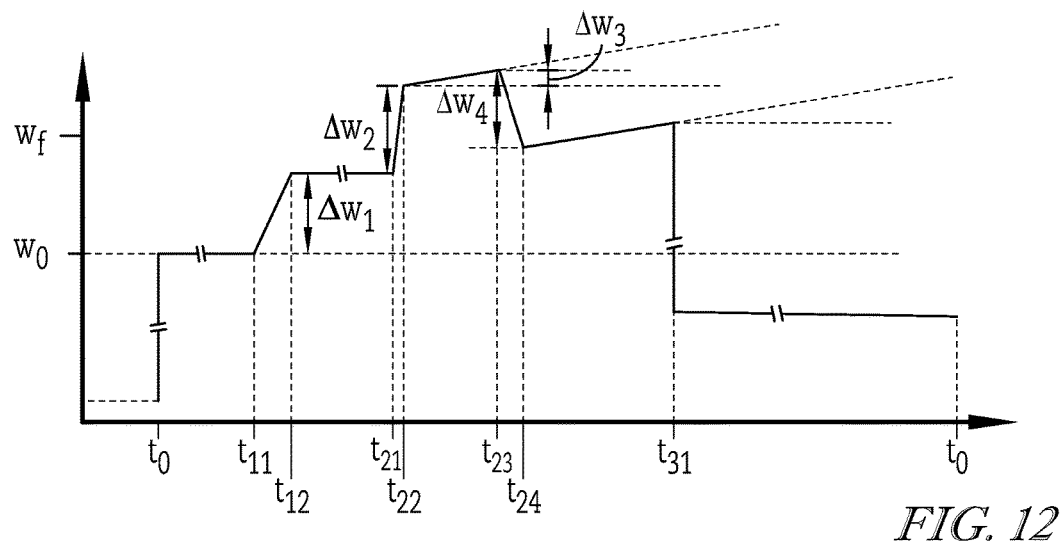
FIG. 12 is a graphical view of a time-based step function that illustrates the method of determining the net weight change of the patient while added non-patient loads remain on the patient support apparatus.

Another exemplary graphical illustration of the signals indicative of addition and removal of non-patient loads 46 on the patient support apparatus 10 over the patient's occupancy time period is shown in FIG. 12. In FIG. 12, some non-patient loads 46 added on the therapy surface 36 over the patient's occupancy time period still remain on the therapy surface 36 of the patient support apparatus 10 after the patient's occupancy time period. Referring to the weight event signal between $t_{11}$ and $t_{12}$ of FIG. 12, the controller 24 determines that the positive dl/dt is greater than the biological gain threshold dl/dt. Accordingly, the controller 24 concludes that the weight event signal from $t_{11}$ to $t_{12}$ corresponds to the addition of the non-patient load 46 and stores the weight of the added non-patient load 46 ($+\Delta W_1$) in the memory 32. The controller 24 further determines that another positive dl/dt of the weight event signal between $t_{21}$ and $t_{22}$ is greater than the biological gain threshold dl/dt. Accordingly, the controller 24 concludes that the weight event signal from $t_{21}$ to $t_{22}$ also corresponds to the addition of the non-patient load 46 and stores the weight of the added non-patient load 46 ($+\Delta W_2$) in the memory 32.

The controller 24 further determines that the positive dl/dt of the weight event signal between $t_{22}$ and $t_{23}$ of FIG. 12 is less than the biological gain threshold dl/dt. Accordingly, the controller 24 concludes that the weight event signal from $t_{22}$ to $t_{23}$ corresponds to the addition of the patient-related load 52 (+W3). Lastly, the controller 24 determines that the negative dl/dt of the weight event signal between $t_{23}$ and $t_{24}$ has a more severe slope than the biological loss threshold dl/dt. Accordingly, the controller 24 concludes that the weight event signal from $t_{23}$ to $t_{24}$ corresponds to the removal of the non-patient load 46 and stores the weight of the removed non-patient load 46 ($-\Delta W_4$) in the memory 32. No weight changes or movements on the patient support apparatus 10 are observed between $t_0$ to $t_{11}$ and $t_{12}$ to $t_{21}$ as indicated by the zero rate of weight change (dl/dt=0).

The controller 24 routinely determines the net weight of the non-patient loads 46 on the patient support apparatus 10 by adding the weight of non-patient loads 46 removed from the patient support apparatus 10 ($\Sigma(-\Delta W)$) to the weight of non-patient loads 46 added to the patient support apparatus 10 ($\Sigma(+\Delta W)$). For example, the net weight of the non-patient loads 46 on the patient support apparatus 10 at $t_{31}$ in FIG. 12 is determined by ($\Delta W_1 + \Delta W_2$)+($-\Delta W_3$). As described above, to determine the weight change of the patient 12 ($\Delta W_{PT}$) during or after the patient's occupancy time period, the controller 24 determines the current apparent weight ($W_f$) of the patient support apparatus 10 and offsets a net weight of the non-patient loads 46. Subsequently, the net weight change of the patient 12 ($\Delta W_{PT}$) is stored in the memory 32. To determine the true patient weight ($W_{PT}$), the controller 24 recalls the initial patient weight ($W_i$) stored in the memory 32 and adds the net weight change of the patient 12 ($\Delta W_{PT}$): $W_{PT} = W_i + \Delta W_{PT}$.

Although certain illustrative embodiments and graphical illustrations have been described in detail above, variations and modifications exist within the scope and spirit of this disclosure as described and as defined in the following claims.

The invention claimed is:

1. A patient support apparatus comprising:
   a patient support,
   a weighing scale comprising a plurality of load cells that supports the patient support, each load cell configured to produce a signal indicative of a load on that load cell, and
   a controller in communication with the plurality of load cells, the controller configured to:
   determine whether the patient support is supporting a patient,
   calibrate, in response to determining that the patient support is supporting the patient by the controller, the weighing scale to a zero state,
   receive, subsequent to calibrating the weighing scale, signals provided by the plurality of load cells in response to a load change detected on the patient support apparatus, the sum of the signals indicative of the load supported by the load cells,
   detect, subsequent to zeroing the weighing scale and in response to receiving the signals, whether the load change represents a non-patient weight event on the patient support based on determining a time rate of change of the weight associated with the particular non-patient weight event,
   determine a net weight change of the patient being supported on the patient support over an occupancy time period by determining a net weight of non-patient load on the patient support apparatus in response to determining the non-patient weight event, and
   automatically update, in response to determining the net weight change, an actual weight of the patient being supported on the patient support.

2. The patient support apparatus in claim 1, the controller further configured to store an initial weight of the patient in a memory before calibrating the weighing scale to the zero state.

3. The patient support apparatus of claim 1, wherein a non-patient weight event includes any addition or removal of non-patient loads from the patient support.

4. The patient support apparatus of claim 1, wherein a non-patient load comprises any non-patient-related items and any non-biological byproduct of the patient.

5. The patient support apparatus of claim 1, wherein determining whether the load change represents the non-patient weight event comprises:
   monitoring the signals over the occupancy time period to determine a time rate of change in the load (dl/dt),
   comparing the dl/dt to a corresponding biological threshold dl/dt to identify the dl/dt that exceeds a corresponding biological threshold dl/dt,
   determining the load change (dl) of the signal that exceeds the corresponding biological threshold dl/dt to determine the weight of any added or removed non-patient load,
   storing the weight of the added or removed non-patient load in the memory of the patient support apparatus, and
   automatically updating a net weight of non-patient loads of the patient support apparatus.

6. The patient support apparatus of claim 5, wherein the signal with the positive dl/dt exceeding the biological gain threshold dl/dt corresponds to the addition of the non-patient load on the patient support, and the signal with the magnitude of the negative dl/dt exceeding the magnitude of the biological loss threshold dl/dt corresponds to the removal of the non-patient load from the patient support.

7. The patient support apparatus of claim 1, wherein determining the net weight change of the patient comprises:
   determining a current apparent weight of the patient support apparatus, and
   offsetting the net weight of non-patient loads of the patient support apparatus.

8. The patient support apparatus of claim 1, wherein to determine whether the patient support is supporting the patient further comprises receiving the signals produced by the plurality of load cells, and determining at least one of an occupied state and an unoccupied state, the occupied state being indicated when the patient support is determined to be supporting the patient and the unoccupied state being indicated when the patient support is determined not to be supporting the patient.

9. The patient support apparatus of claim 6, wherein the controller is further configured to:
- set an initial occupancy state of the patient support apparatus to the unoccupied state,
- determine a normalized amount of loads on the plurality of load cells as a function of the signals produced by the plurality of load cells,
- set the current occupancy state of the patient support apparatus to the occupied state in response to the normalized amount of loads on the plurality of load cells satisfying an occupied condition, the occupied condition being defined by the normalized amount of loads being greater than an occupied threshold value, and
- set the current occupancy state of the patient support apparatus to the unoccupied state in response to the normalized amount of loads on the plurality of load cells satisfying an unoccupied condition, the unoccupied condition being defined by the normalized amount of loads being lower than an unoccupied threshold value.

10. The patient support apparatus of claim 2, wherein determining the actual weight of the patient being supported on the patient support comprises adding the net weight change of the patient to the initial weight of the patient stored in the memory.

11. A patient support apparatus comprising:
- a patient support,
- a plurality of load cells supporting the patient support, each load cell configured to produce a signal indicative of a load on that load cell,
- one or more indicators, and
- a controller in communication with the plurality of load cells and the indicators, the controller configured to:
- determine whether the patient support is supporting a patient,
- activate one or more indicators in response to determining that the patient support is no longer supporting the patient,
- reset, in response to determining that the patient support is supporting the patient, a patient occupancy timer of the patient support apparatus, and
- deactivate one or more indicators, subsequent to resetting the patient occupancy timer.

12. The patient support apparatus of claim 11, wherein the controller is further configured to:
- set an initial occupancy state of the patient support apparatus to the unoccupied state,
- determine a normalized amount of loads on the plurality of load cells as a function of the signals produced by the plurality of load cells,
- set the current occupancy state of the patient support apparatus to the occupied state in response to the normalized amount of loads on the plurality of load cells satisfying an occupied condition, the occupied condition being defined by the normalized amount of loads being greater than an occupied threshold value, and
- set the current occupancy state of the patient support apparatus to the unoccupied state in response to the normalized amount of loads on the plurality of load cells satisfying an unoccupied condition, the unoccupied condition being defined by the normalized amount of loads being lower than an unoccupied threshold value.

13. The patient support apparatus of claim 11, further comprising a timer module in communication with the controller, the timer module configured to increment one or more timer values for the controller.

14. The patient support apparatus of claim 13, wherein the controller is further configured to:
- start a patient absence timer in response to determining that the patient support is not supporting the patient,
- determine whether a current value of the patient absence timer is at least one of greater than or equal to a reference absence timer threshold, and
- stop the patient occupancy timer and activate one or more indicators.

15. The patient support apparatus of claim 13, wherein the controller is further configured to:
- receive an indicator reset signal, and
- reset the patient occupancy timer to zero and deactivate one or more indicators.

16. The patient support apparatus of claim 13, wherein the indicator reset signal is produced automatically when the controller detects the activated indicator.

17. The patient support apparatus of claim 13, wherein the indicator reset signal is produced in response to a manual reset input.

18. The patient support apparatus of claim 12, wherein resetting the occupancy time period includes deleting the net weight of non-patient loads and the net weight change of the patient from the memory.

19. The patient support apparatus of claim 12, wherein resetting the occupancy time period includes storing the final net weight of non-patient loads and the final net weight change of the patient in the memory.

20. A patient support apparatus comprising:
- a patient support,
- a weighing scale comprising a plurality of load cells that supports the patient support, each load cell configured to produce a signal indicative of a load on that load cell,
- a processor, and
- at least one machine-readable storage medium comprising a plurality of instructions, that in response to being executed by the processor, result in the patient support apparatus:
- starting a patient occupancy timer and calibrating a weighing scale to a zero state in response to determining that the patient support is supporting a patient,
- receiving, subsequent to calibrating the weighing scale, signals produced by the plurality of load cells in response to any load changes detected on the patient support apparatus,
- detecting a time rate of change in the load (dl/dt) of each signal exceeding a corresponding biological threshold dl/dt,
- determining the load change (dl) of the signal that exceeds the corresponding biological threshold dl/dt to determine the weight of any added or removed non-patient load,
- storing the weight of the added or removed non-patient load in a memory of the patient support apparatus,
- updating a net weight of non-patient loads of the patient support apparatus,
- determining a net weight change of the patient based on the net weight of non-patient loads, and
- determining, in response to determining the net weight change, an actual weight of the patient being supported on the patient support.

21. The patient support apparatus in claim 20, the controller further includes storing an initial weight of the patient in a memory before calibrating the weighing scale to the zero state.

22. The patient support apparatus in claim 20, wherein detecting the signal exceeding a corresponding biological threshold rate includes (i) determining the dl/dt of the signal, (ii) determining whether the signal has a positive dl/dt or a negative dl/dt, and (iii) comparing a positive dl/dt with a biological gain threshold dl/dt, and a negative dl/dt with a biological loss threshold dl/dt.

23. The patient support apparatus of claim 22, wherein the signal with the positive dl/dt exceeding the biological gain threshold dl/dt corresponds to the addition of the non-patient load on the patient support, and the signal with the magnitude of the negative dl/dt exceeding the magnitude of the biological loss threshold dl/dt corresponds to the removal of the non-patient load from the patient support.

24. The patient support apparatus of claim 21, wherein the net weight change of the patient is determined by offsetting the net weight of the non-patient loads from a current apparent weight of the patient support apparatus.

25. The patient support apparatus of claim 21, wherein determining the actual weight of the patient being supported on the patient support includes adding the net weight change of the patient to the initial weight of the patient stored in the memory.

\* \* \* \* \*